PRESSURE SENSOR

INVENTOR.
JAMES W. ANGUS

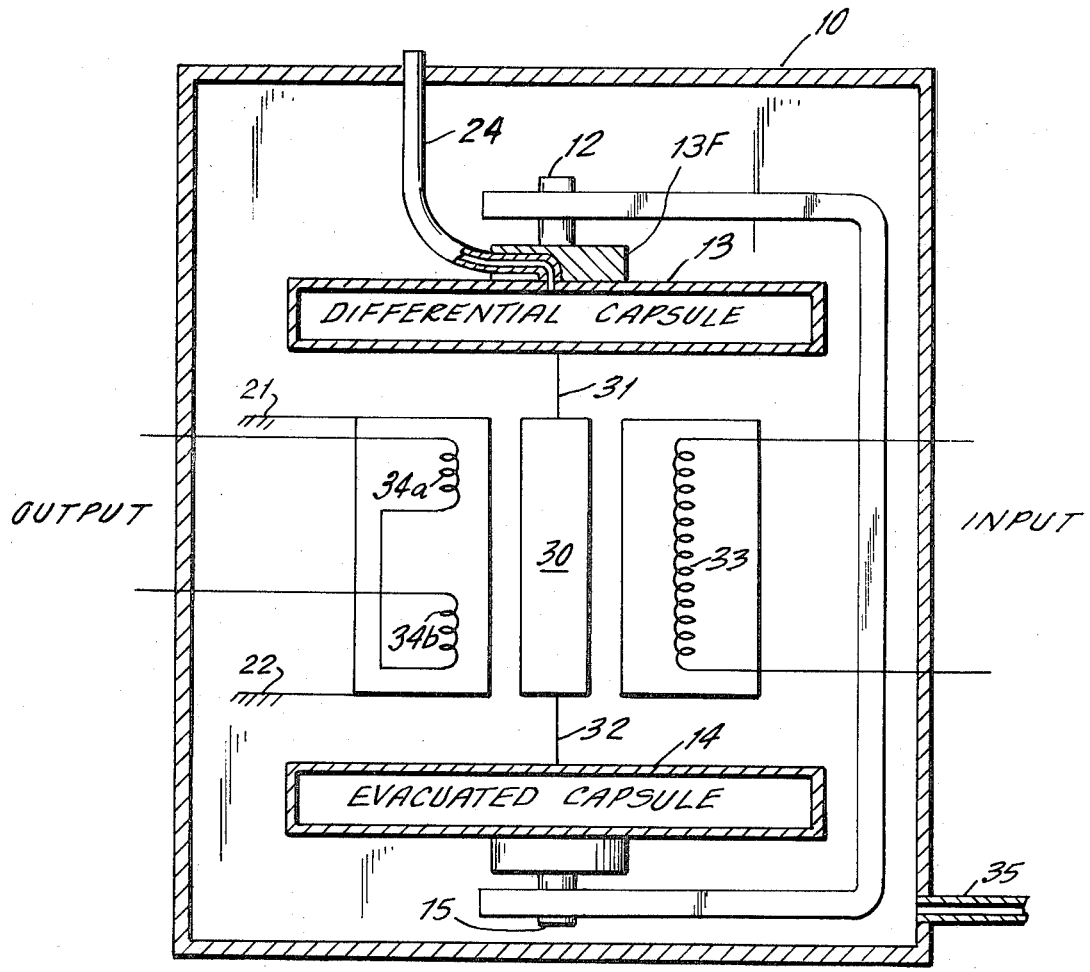

3,518,885
EXTREME ENVIRONMENT PRESSURE SENSOR
James W. Angus, Baldwin, N.Y., assignor to Kollsman Instrument Corporation, Syosset, N.Y., a corporation of New York
Filed Oct. 24, 1968, Ser. No. 770,234
Int. Cl. G01l 9/10
U.S. Cl. 73—398　　　　　　　　　　　　　　　　8 Claims

ABSTRACT OF THE DISCLOSURE

An absolute pressure sensor is formed of two expandable capsules, one of which is a differential capsule having its interior connected to the pressure to be measured and the other of which is evacuated. Both capsules are exposed to a common external pressure. The opposite end walls of the capsules are rigidly mounted on a support shell and their opposing walls are directly connected together to one another with a motion pickup connected at the junction between the opposing walls. The assembly of the capsules is, therefore, rigidly mounted, and is resistive to shock or extreme vibration. The capsules may be formed of a high strength, low hysteresis nickel alloy steel welded by a tungsten inert gas process, or other suitable technique, whereby the capsules can be used in a high temperature environment. The capsules are then contained within a stainless steel housing which is filled with a first gas pressure while the interior of the differential capsule is filled with the pressure to be measured. The deflection of the central connection point between the opposing walls of the two capsules will move in accordance with the pressure to be measured.

BACKGROUND OF THE INVENTION

Figure 1:
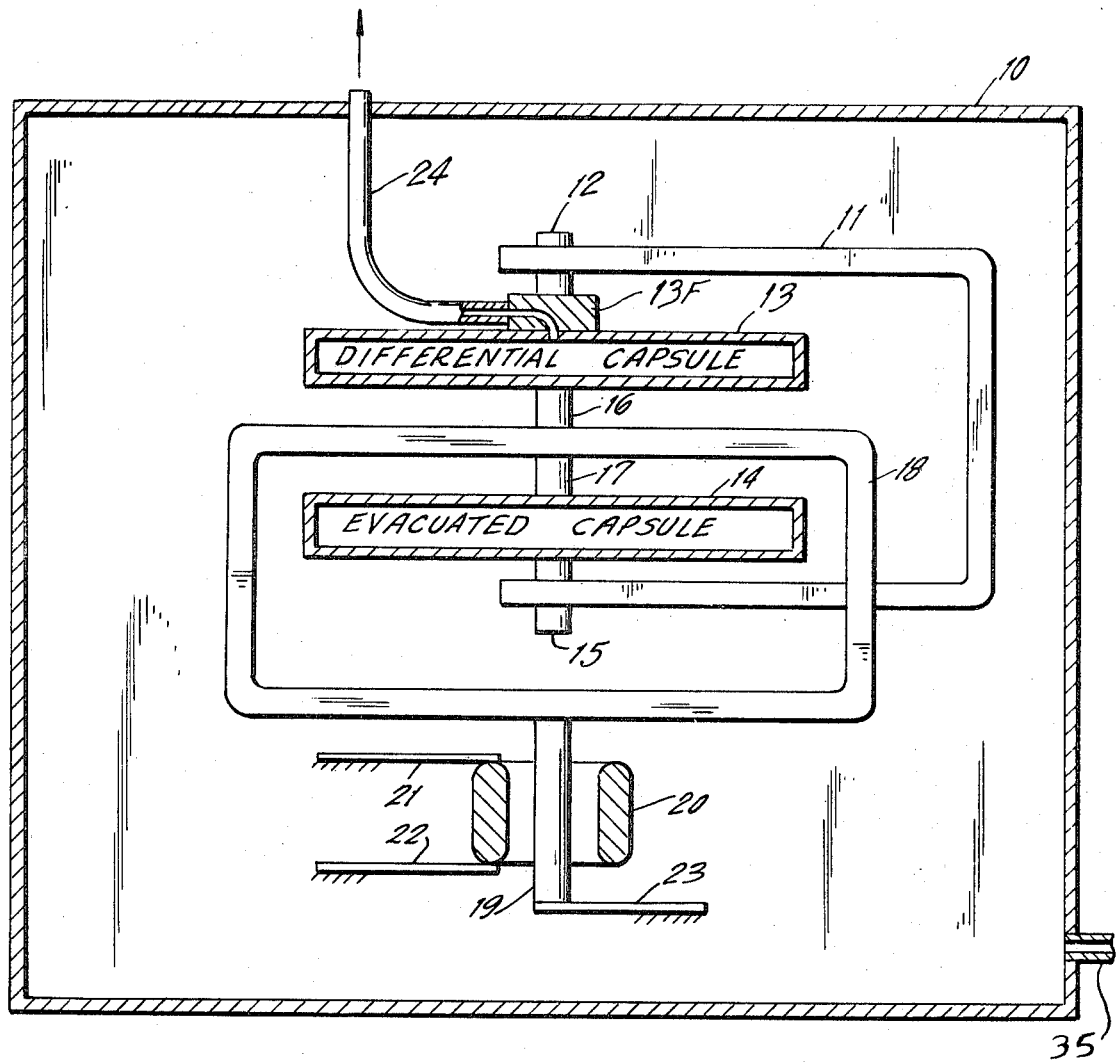

This invention relates to pressure measurement apparatus, and more particularly relates to a novel pressure measuring device which can operate in a high temperature and extreme vibration environment. In order to measure the pressure within a jet engine, or the like, it has been necessary to connect pressure conduits from the engine to regions remote from the engine where a suitable expandable capsule can be mounted to respond to the pressure being measured. The use of such conduits is undesirable since they are a source of error in the pressure measurement and since they reduce the reliability of the system.

In accordance with the present invention, a pressure sensor is provided which can be used in extremely hostile environments such as the high temperature, extreme vibration environment in or adjacent to a jet engine. Obviously, the novel invention can be used in other similar or less stringent environments. In accordance with the invention, a buck type dual capsule arrangement is provided wherein each capsule has one of its walls anchored with respect to a main support structure, while their free walls are interconnected through a pre-stressed joint. One of the capsules is evacuated, while the interior of the other of the capsules is subjected to the pressure which is to be measured. Both capsules are exposed to the same exterior pressure. As the pressure to be measured changes, the connection joint between the adjacent walls of the two capsules will move in proportion to the pressure change. A pickup structure such as a differential transformer of any desired type is responsive to the movement of the connection joint to provide an indication of the pressure measurement.

The capsules and their mounts are conveniently formed of material adapted to withstand high temperature conditions. Such materials are well known to the art.

Accordingly, a primary object of this invention is to provide a novel pressure sensor operable in extremely high vibration environments such as are presented by jet engines.

Another object of this invention is to provide a novel pressure sensor device and detector therefor having the same static deflection and resonant frequency to eliminate the need for auxiliary balance means.

A further object of the invention is to provide a novel pressure sensor which does not require shafts or gears and has increased reliability and increased useful life.

These as well as other objects of this invention will become readily apparent after reading the following description of the accompanying drawings in which:

FIG. 1 is a schematic diagram of one embodiment of a buck type dual capsule arrangement constructed in accordance with the present invention and using a preloaded compression joint connected between the free wall of the capsules; and FIG. 2 schematically illustrates another embodiment of the present invention using a pre-loaded tension joint between the free walls of the capsule and showing a direct pickup for the joint.

Referring now to FIG. 1, a main housing is illustrated generally at 10 and is shown provided with a rigidly mounted internal support 11 of generally U-shape. Lock elements 12 and 15 are carried in axially opposing adjustable relation at the extremities of the legs of the support 11 and are utilized for providing a stable mounting arrangement for a buck-type dual capsule system which as shown includes a differential pressure capsule 13 and an evacuated capsule 14 and a connection joint. In the embodiment of FIG. 1, the connection joint consists of lock elements 16 and 17 rigidly mounted upon a connecting link 18 to be movable axially as a unitary body in accordance with changes in the pressure conditions which are to be sensed by the capsule arrangement.

The capsules are of a standard type currently in use in the pressure measuring field and are made of materials suited to the particular environment of use. In the pressure sensor arrangement as shown in FIG. 1 the connection joint is normally subjected to a compression load. The differential capsule 13 has a boss 13F engaged by the lock element 12 and serving as an inlet fitting communicating with a conduit 24 leading to the particular region where pressure is to be measured.

The housing 10 is shown with an inlet line 35 for connection to ambient pressure, for example, the atmospheric pressure. In an illustrative application of the pressure sensor shown in FIG. 1, the pressure within chamber 10 typically is about 15 inches Hg and the pressure in line 24 typically ranges from 5 inches to about 100 inches Hg. The device is intended to operate under a prescribed compressed preload on the connection joint.

To set the initial compression, the element 12 is rigidly locked to the support frame 11 and vacuum is pulled through line 24 on the differential capsule 13 to a level determined by the desired preload. At this point, element 15 is locked in place on the support frame in a position to establish snug interengagement of the elements of the joint. The vacuum is then relieved through line 24 so that the capsule 13 expands to establish the prescribed compression preload on the movable joint 16, 17, 18. Actually, the walls of capsules 13 and 14 are inwardly bowed initially. Any change in the pressure in capsule 13 causes axial movement of the connection joint including link 18. Increases in pressure cause downward movement of link 18 and decreases in pressure cause upward movement.

Under most operating conditions the pressure in line 24 is greater than that in chamber 10 which acts upon the exterior of both capsules and the joint always operates under compression. A slight amount of underpressure in capsule 13 can be tolerated in this configuration, however, the pressure in capsule 13 should not be permitted to fall so far below the pressure in chamber 10 as to relieve the initial preload condition. Loss of the preload would cause the plane of the convolutions of the capsule wall to take on an S configuration indicating a reversal of the stress pattern. Such a condition is prone to vibration problems. There is a dead band, therefore, at the neutral point of the capsules. The described mounting arrangement for the capsules provides rigid supporting structures for the fixed walls of the capsules and a rugged pre-stressed connection joint between the free walls of the capsule. After the initial adjustment of the preload all of the parts can be securely locked in place to retain the desired calibration. Thus, the capsule assembly is relatively unaffected by extreme vibration conditions as compared to the usual capsule arrangement for measurement of absolute pressure in which at least one wall of the capsule is unsupported.

Connecting link 18 which serves as a portion of the motion pick-off structure is connected to a magnetic core 19 of a suitable linear differential voltage transformer of any well known type. Such a transformer is schematically illustrated in FIG. 1 as having a body portion 20 supported by and between the free ends of a pair of suitable leaf springs 21 and 22 which are each rigidly mounted at their other ends. Similarly, the bottom of core 19 abuts the free end of a leaf spring 23 which has its other end rigidly mounted.

In general, the body 20 of the differential voltage transformer contains primary and secondary windings arranged so that the electrical output of the secondary winding is dependent upon the axial position of core 19. Thus, the output signal is related to the particular pressure applied to the interior of capsule 13. It should be understood that a suitable temperature compensation device (not shown) can be incorporated in the output circuit of the secondary winding (not shown), to accommodate the different ambient temperature conditions that the device may experience.

The pressure which is to be measured is supplied through the conduit 24 connected to extend through housing 10 and into the interior of differential capsule 13. It will be apparent that the pressure applied to the interior of capsule 13 will cause movement of capsule wall 16 and of connecting link 18 in accordance with the pressure in the interior of differential capsule 13.

An arrangement suitable for higher pressure ranges is shown in FIG. 2 wherein corresponding reference characters designate corresponding parts. In FIG. 2 the free walls of the capsules 13 and 14 are shown interconnected by a pretensioned connection joint which includes a magnetic core 30 of a differential transformer and load wires 31 and 32 joining the ends of the core to the respective capsules 13, 14.

In order to pre-tension the pressure sensor arrangement of FIG. 2, the mounting element 12 is locked to its support frame 11 and high pressure is applied through line 24 to the interior of capsule 13 equivalent to the approximate value which is to be experienced in ultimate use. Finally, the mounting element 15 is locked in place to the support frame. Thereafter, the pressure in capsule 13 is relieved and the return of capsule 13 determines the extent of the tension preload acting on the connection joint. Typical operating pressures for the arrangement of FIG. 2 are given as follows: for chamber 10, a pressure in excess of 15 inches Hg, for example, 50 inches Hg; and for line 24 pressures may go as high as 500 inches Hg. Once again all of the capsule walls are stably mounted and interconnected to avoid vibration problems. The pressure in line 24 can reach values lower than the pressure acting in chamber 10 up to the neutral point at which the pre-tension load is lost and the S shape wall configuration results.

In each of the disclosed embodiments, the housing 10 is preferably made of aluminum having a high polished exterior surface and a black body interior finish to provide for good radiation away from the sensor elements where the device is used in a high temperature environment.

Thus, both of the illustrated embodiments are suited for extremely rugged absolute measurement systems in extreme vibration environments. Where high temperatures are also to be endured such as within a jet engine the capsules and the related load bearing elements are preferably made of a high strength low hysteresis nickel alloy steel with all joints welded by any suitable process such as a tungsten inert gas process or electron beam welding. Alternatively, support shell 11 can be made of stainless steel to impart suitable stability to the sensor throughout a high temperature range.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. In a pressure sensor, a buck-type dual capsule arrangement having a pair of pressure capsules each having flexible diaphragm end walls, means to subject the capsules to fluid pressures, and means for mounting the capsules in a pre-loaded opposing stress relationship wherein each capsule has one end wall centrally fixed against movement and one end wall free to move, said last named means including an interconnection engaged in opposing stress relationship between the free end walls to effect joint movement of the free end walls and the interconnection in accordance with changes in the pressure conditions acting on said arrangement.

2. In a pressure sensor in accordance with claim 1 wherein said interconnection is under compression.

3. In a pressure sensor in accordance with claim 1 wherein said interconnection is under tension.

4. In a pressure sensor in accordance with claim 1 and wherein said pressure capsules are disposed with said free end walls in back-to-back confronting relation and said interconnection extends directly therebetween.

5. In a pressure sensor in accordance with claim 1 and wherein one of said capsules is substantially evacuated, the other of said capsules has its interior subjected to a pressure to be sensed and both capsules have their exteriors subjected to a common ambient pressure.

6. In a pressure sensor in accordance with claim 1 and including pressure indicating means responsive to movement of said interconnection.

7. In a pressure sensor in accordance with claim 1 and wherein one of said capsules is a differential pressure capsule and the other of said capsules is an evacuated capsule and said capsules are disposed with said free end walls in back-to-back confronting relation and said interconnection extends directly therebetween.

8. In a pressure sensor in accordance with claim 1 and including a differential transformer pickup means responsive to movement of said interconnection.

References Cited

UNITED STATES PATENTS 3,354,722   11/1967   Waite et al. _____ 92—39 XR

DONALD O. WOODIEL, Primary Examiner

U.S. Cl. X.R.

73—407, 410; 92—39